United States Patent
Titus

(10) Patent No.: US 10,200,435 B2
(45) Date of Patent: Feb. 5, 2019

(54) NETWORK COMMUNICATIONS SERVICE QUALITY MONITOR

(71) Applicant: Timothy G. Titus, Santa Clara, CA (US)

(72) Inventor: Timothy G. Titus, Santa Clara, CA (US)

(73) Assignee: PathSolutions, Inc., Santa Clara, CA (US)

( * ) Notice: Subject to any disclaimer, the term of this patent is extended or adjusted under 35 U.S.C. 154(b) by 226 days.

(21) Appl. No.: 15/273,422

(22) Filed: Sep. 22, 2016

(65) Prior Publication Data

US 2017/0085618 A1     Mar. 23, 2017

Related U.S. Application Data

(60) Provisional application No. 62/222,056, filed on Sep. 22, 2015.

(51) Int. Cl.
G06F 15/173 (2006.01)
H04L 29/06 (2006.01)
H04L 12/26 (2006.01)

(52) U.S. Cl.
CPC ............ *H04L 65/80* (2013.01); *H04L 43/087* (2013.01); *H04L 43/0829* (2013.01); *H04L 43/0858* (2013.01); *H04L 65/1083* (2013.01)

(58) Field of Classification Search
USPC ........................................................ 709/224
See application file for complete search history.

(56) References Cited

U.S. PATENT DOCUMENTS

| | | | | |
|---|---|---|---|---|
| 6,671,747 B1 * | 12/2003 | Benkual | ............. | G06F 9/30043 710/1 |
| 7,274,670 B2 * | 9/2007 | Hicks | ................. | H04L 41/5009 370/252 |
| 7,293,100 B2 * | 11/2007 | Jayam | ................... | F04D 29/384 370/218 |
| 7,535,900 B2 * | 5/2009 | Shenoi | ............. | H04L 29/06027 370/355 |
| 7,689,857 B2 * | 3/2010 | Lewis | ................. | H04L 41/0213 370/229 |
| 7,782,787 B2 * | 8/2010 | Karol | ...................... | H04L 43/50 370/216 |
| 7,925,206 B2 * | 4/2011 | Jha | ........................ | H04L 1/0001 455/11.1 |
| 8,046,765 B2 * | 10/2011 | Cherkasova | .......... | G06F 9/5061 718/104 |
| 8,089,870 B2 * | 1/2012 | Bernstein | ............ | H04L 41/5009 370/229 |
| 8,265,076 B2 * | 9/2012 | Pignatelli | ............. | H04L 45/125 370/392 |

(Continued)

*Primary Examiner* — Alicia Baturay
(74) *Attorney, Agent, or Firm* — GSS Law Group

(57) ABSTRACT

A quality of service monitor adapted to measure a separate value for a quality of service for each of a plurality of monitoring intervals, where each monitoring interval is shorter than the total time duration of a network communications session and longer than the time duration of one data packet in the plurality of packets included in the session. A processor searches for the one monitoring interval with the poorest quality of service value and reports the quality of service for the session as the poorest quality of service for the one monitoring interval.

9 Claims, 7 Drawing Sheets

(56) References Cited

U.S. PATENT DOCUMENTS

| | | | | |
|---|---|---|---|---|
| 8,291,083 | B2* | 10/2012 | Black | H04L 67/16 709/205 |
| 8,392,499 | B2* | 3/2013 | Cherkasova | G06Q 30/00 709/203 |
| 8,396,970 | B2* | 3/2013 | Black | G06F 9/5027 370/338 |
| 8,458,290 | B2* | 6/2013 | Black | H04L 67/1097 709/217 |
| 8,478,858 | B2* | 7/2013 | Dunbar | H04N 21/2181 709/201 |
| 8,521,813 | B2* | 8/2013 | Black | H04L 67/16 709/203 |
| 8,615,577 | B2* | 12/2013 | Black | H04N 21/23106 709/201 |
| 8,619,949 | B2* | 12/2013 | Mishra | H04M 3/567 379/88.18 |
| 8,848,566 | B2* | 9/2014 | Dunne | H04L 41/5025 370/252 |
| 8,854,954 | B2* | 10/2014 | Dunne | H04L 41/5025 370/228 |
| 8,856,329 | B2* | 10/2014 | Black | H04L 67/1097 709/225 |
| 8,948,129 | B2* | 2/2015 | Murphy | H04L 12/4633 370/331 |
| 9,094,499 | B2* | 7/2015 | Dunne | H04L 65/80 |
| 9,154,610 | B2* | 10/2015 | Dunne | H04L 65/80 |
| 9,185,005 | B2* | 11/2015 | Cao | H04L 41/5067 |
| 9,355,129 | B2* | 5/2016 | Gupta | G06F 17/30306 |
| 9,516,524 | B2* | 12/2016 | Johansson | H04W 24/08 |
| 9,537,707 | B2* | 1/2017 | Salama | H04L 29/08954 |
| 9,571,328 | B2* | 2/2017 | Salama | H04L 29/08954 |
| 9,692,630 | B2* | 6/2017 | Qi | H03M 13/6306 |
| 9,755,781 | B2* | 9/2017 | Qi | H03M 13/6306 |
| 9,787,441 | B2* | 10/2017 | Mishra | H04M 3/567 |
| 9,838,157 | B2* | 12/2017 | Qi | H03M 13/6306 |
| 9,998,338 | B2* | 6/2018 | Dao | H04L 47/14 |
| 2002/0097674 | A1* | 7/2002 | Balabhadrapatruni | H04L 12/2801 370/229 |
| 2003/0120773 | A1* | 6/2003 | Mueller | H04L 29/06027 709/224 |
| 2004/0071095 | A1* | 4/2004 | Raisanen | H04L 41/00 370/252 |
| 2013/0055283 | A1* | 2/2013 | Mopur | G06F 9/5083 718/104 |
| 2015/0236818 | A1* | 8/2015 | Qi | H04L 1/0054 375/341 |

* cited by examiner

NETWORK COMMUNICATIONS SERVICE QUALITY MONITOR

FIELD OF THE INVENTION

Embodiments are related to measurements of quality of service for streaming video, streaming audio, and voice over Internet telephone calls.

BACKGROUND

The networking industry is rapidly converting to providing packet based services like Voice over Internet Protocol (VoIP), live video, streaming, video, streaming audio, and other real-time service where a time delay between transmission and reception of data is very short and received packets arrive in the same order as transmitted packets. VoIP telephone services are rapidly expanding worldwide and threatening traditional telephone services. VoIP service provides call quality similar to conventional telephone service, but generally at much lower cost. Some VoIP telephones may be implemented as downloadable software executing on a general-purpose laptop computer, desktop computer, smart phone, or tablet computer equipped with a microphone and speakers or a headphone connector. Other configurations may allow ordinary telephones to be plugged in with a standard RJ-11 modular jack to a broadband router equipped with VoIP ports. Businesses may configure virtual PBX networks in which some of the subscriber telephone extensions are located off-site, for example at an employee's home, with data communications conducted through a broadband router.

Global communication network operators, located at a few centralized network management centers, may rely on automated network management applications to analyze, process, display and manage their networks. Network management applications may be designed to monitor network utilization and errors at regular intervals, for example at five-minute intervals, so overall network health can be determined and operational adjustments or equipment repairs or replacements made as needed. Network management applications may further provide historical data relating to a network's operation, possibly showing performance trends useful for decision making regarding utilization of network resources.

In general, VoIP calls occur asynchronously to network monitoring activities. Calls may be made at any time and may last for any duration. After a call is completed, a VoIP telephone may provide statistics relating transmission and reception of data packets carrying call data, for example average latency, average packet loss, and average jitter measurements. However, a VoIP telephone may have limited processor and/or memory resources that prevent or restrict statistics from being measured, stored, and reported.

Measurements of quality of service by a VoIP-enabled device on a communications network may differ substantially from a person's perception of quality of service. For example, if a VoIP call lasts 30 minutes, and call quality by the caller's perception is good for 29 minutes and 30 seconds, but 30 seconds of the call is perceived as very poor quality, then the caller may have the opinion that the quality of service was "very bad" or "unacceptable". The caller's perception may differ from statistics measured by the VoIP-enabled device. In contrast to the caller's perception, the VoIP-enabled device may report a high quality of service value derived from average performance over the total time duration of the call, since the call quality was good for more than 98% of the 30-minute call duration. Statistical results including averaging calculations may not indicate when quality of service is poor according to user perceptions.

SUMMARY

An example of a quality of service (QOS) monitor embodiment includes a processor, a memory connected for data communication with said processor, and a network interface connected for data communication with said processor. The example of a QOS monitor embodiment further includes a duration of a monitoring interval stored by the processor in the memory, wherein the duration of a monitoring interval is less than a duration of a network communications session. The example of a QOS monitor embodiment further includes a quality of service value for the monitoring interval measured by the processor and stored in the memory; a poorest quality of service value stored in the memory by the processor, the poorest quality of service determined by the processor from a plurality of the monitoring interval; and a quality of service stored for a complete session stored in the memory by the processor, the quality of service for a complete session corresponding to the value for a poorest quality of service measured for one of the monitoring interval.

DESCRIPTION

Figure 1:
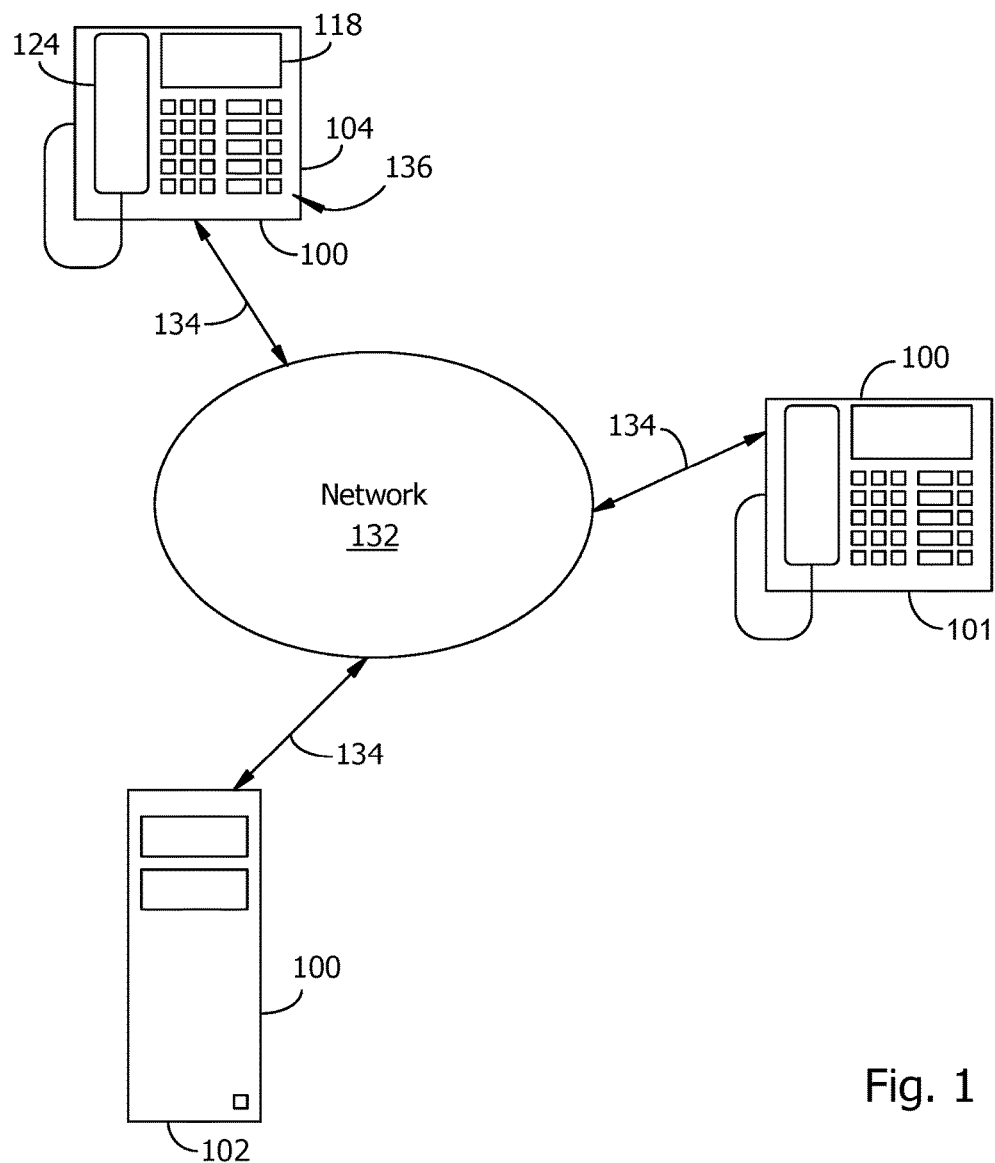
FIG. 1 shows an example VoIP endpoint device embodiment connected to a communications network for bidirectional data communication with another VoIP endpoint device and possibly with an optional monitoring system.

An example embodiment of a Quality of Service (QOS) monitor is adapted to exchange data packets with other network-connected devices, measure QOS values determined for each of a plurality of intervals within one communications session, and report a quality of service value for the entire session corresponding to the poorest quality of service found for any one interval during the session. A QOS monitor embodiment may report other network performance parameters correlated in time with the time of each monitoring interval to aid in identifying the causes of a QOS problem. Examples of QOS values measured by a QOS monitor embodiment include, but are not limited to, average latency, average jitter, overall packet loss, and overall number of out-of-order packets that arrived at the QOS monitor.

For example, during a telephone call made with a Voice over Internet Protocol (VoIP) endpoint, a QOS monitor embodiment determines a value for each of a plurality of monitoring intervals, where each monitoring interval is shorter than the session representing the duration of the telephone call. The monitoring interval with the poorest QOS is identified by a search of QOS values stored for all intervals during the session. The QOS value for the session may be identified as the monitoring interval with the poorest QOS value, in contrast to previously known methods for reporting QOS as a value averaged over the entire time duration of a session. By measuring and identifying QOS values for monitoring intervals rather than the full length of a session, a QOS monitor embodiment arrives at an estimate for quality of service that more closely approximates a person's perception of quality of service.

QOS monitor embodiments may apply QOS measurements to monitoring intervals for network communications including, but not limited to, VoIP telephone calls, audio streaming, video streaming, and other transmissions of sequences of related data packets organized into sessions. A session may include more than one message between communicating devices, and each message may include many data packets. Other examples of network communications compatible with a QOS monitor embodiment include, but are not limited to, network communications related to Virtual Desktop Infrastructure (VDI), for example viewing and controlling an application executing on one network-attached system from on another network-attached system, and remote desktop sharing.

Examples of QOS monitor embodiments directed at VoIP applications include, but are not limited to, a VoIP telephone, a laptop computer running VoIP software, a desktop computer running VoIP software, a tablet computer running VoIP software, a VoIP gateway, a voice processing/storage server, and a Session Initiation Protocol (SIP) trunk endpoint. QOS monitor embodiments may measure and report quality of service values related to a VoIP telephone call's worst interval of performance. The worst interval of performance may be correlated in time with other performance measurements made by a network monitoring system to assist in determining reasons for poor quality of service.

The monitoring intervals used by a QOS monitor embodiment may be asynchronous to the received data packets, that is, the beginning and ending of any one monitoring interval may not be aligned in time with the beginning or ending of a data packet carrying, for example, VoIP data, video data, and/or audio data. An audio and/or video message transmitted from or received by a VoIP endpoint device may include many data packets. An example QOS monitor embodiment may determine which network performance indicators are correlated in time with each monitoring interval to determine which intervals had the poorest quality of service, and which network performance values are associated with those intervals having the poorest quality of service.

A QOS monitor embodiment may have a setting for a time duration of a monitoring interval. For example, a monitoring interval may have a default setting of 5 seconds duration, although many other values for a time duration of a monitoring interval may be selected. For example, the monitoring interval in a VoIP endpoint embodiment may be set by a person using the VoIP endpoint device, by a PBX in data communication with a QOS monitor embodiment, or by a network operator from a network management station.

A QOS monitor embodiment may include a setting for a number of peak values to store and return to a monitoring system. For example, the number of peak values may be set to a default value of 5, although many other values for peak values may be selected. The number of peak values stored in the QOS monitor may be set by a person using the QOS monitor, by a PBX in data communication with a VoIP endpoint embodiment, or by a network operator from a network management station.

An example QOS monitor embodiment may monitor a session and measure and save values for peak latency, peak jitter, peak packet loss, and peak out-of-order arrivals measured during an embodiment during any monitoring interval for the entire session. Each peak value may also have a timestamp of when that peak value was encountered. As used herein, a peak value is a maximum value, for example a maximum value of latency, packet loss, jitter, or another measured value, over a selected time duration. Jitter is a time variation in the time delays of received packets. Latency is a time delay that may be the result of any one or more of propagation time through a network, serialization, implementation of a data protocol, packet transmission through a router, switch, or other network device, packet queuing, and packet buffering.

A peak value may represent a count of events over the selected time duration, for example the duration of a monitoring interval or the duration of a session. At the end of a session, an embodiment may send information to a monitoring system. Examples of the information sent may include, but are not limited to, codec used, monitoring interval, average latency, average jitter, overall packet loss, overall out-of-order packets, peak latency and timestamp, peak jitter and timestamp, peak packet loss and timestamp, and peak out-of-order packets and timestamp.

A monitoring system may monitor the network for utilization, latency, jitter, and packet loss. The monitoring system may be able to accurately correlate the time of an occurrence of poor call quality with other performance measurements of the network.

Turning now to the figures, an example QOS monitor embodiment 100 is shown connected for sending and receiving data packets through an example communications network 132 in FIG. 1. Data connections 134 between a QOS monitor embodiment 100 and the network 132 may be implemented as wired connections or as wireless connections. A monitoring system 102 may optionally be connected for data communication with the network 132 to monitor and report on network performance. The QOS monitor embodiment 100 may exchange data packets with another network-attached device 101 and/or the monitoring system 102 over the network 132. The network-attached device 101 may be a second QOS monitor 100 or may alternately be a network-enabled device previously known in the art.

Figure 2:
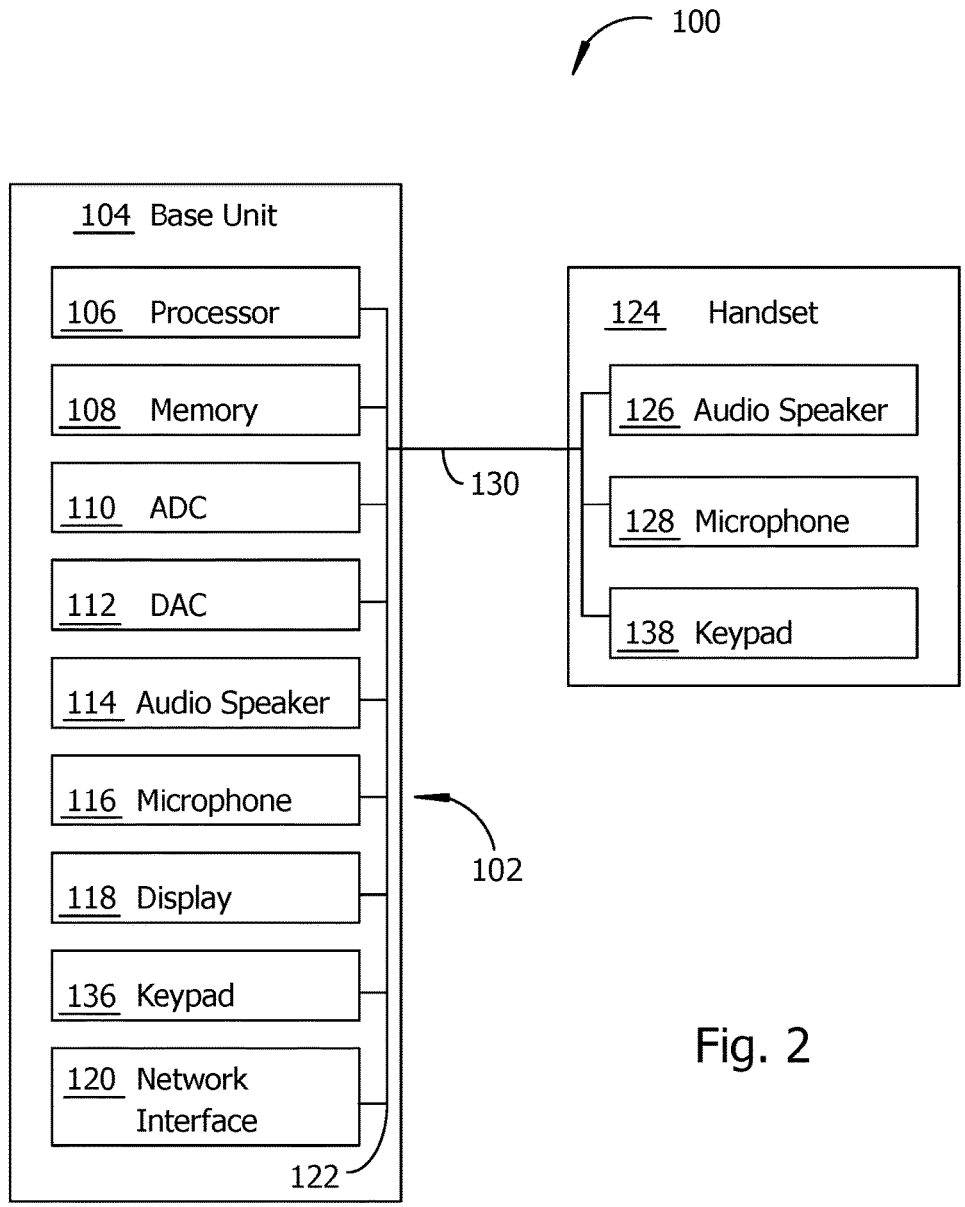
FIG. 2 is a block diagram of some hardware components of an example VoIP endpoint device embodiment.

FIG. 2 shows a simplified block diagram of an example QOS monitor embodiment. In the example of FIG. 2, a QOS monitor 100 may include a base unit 104 and an optional handset 124 coupled to the base unit for exchange of electrical signals over connections 130. In some embodiments of a QOS monitor, the optional handset 124 may be replaced with a headset with speakers and a microphone, by a separate microphone and speaker, or by a microphone and a speaker in a desktop or laptop computer. Connections 130 may be implemented as wired connections or alternately as wireless connections. The optional handset 124 may include an audio speaker 126, a microphone 128, and a keypad 138. The base unit 104 may include a processor 106 electrically connected by a data and command bus 122 to a memory 108, an analog to digital converter (ADC) 110, a digital to analog converter (DAC) 112, an audio speaker 114, a microphone 116, an optional display 118, a keypad 136, and a network interface 120.

The example processor 106 is preferably implemented in hardware with a plurality of semiconductor devices. Examples of a processor 106 include, but are not limited to, a microcontroller, a microprocessor, an applications specific integrated circuit (ASIC) including a microcontroller or microprocessor, a gate array including a microcontroller or microprocessor, a programmable logic device (PLD) including a microprocessor or microcontroller, and a field programmable gate array (FPGA) including a microcontroller or microprocessor.

The example memory 108 may be implemented as dynamic memory, static memory, a combination of dynamic and static memory, and/or a combination of volatile and nonvolatile memory.

The example network interface 120 may be implemented as a wired interface to the network 132 or alternately as a wireless interface to the network. Data packets sent and received by the processor 106 while communicating with other devices on the network 132 pass through the network interface 120.

FIG. 2 further represents an example of components included in a monitoring system 102. The monitoring system 102 in the example of FIG. 2 may be, for example, a laptop computer, a desktop computer, or another device in accord with a QOS monitor embodiment 100. The example monitoring system 102 may include a processor 106 in data communication with a memory 108 and a network interface 120 over a data and command bus 122 and may optionally include a display 118 and a keypad 136. The keypad 136 may be implemented as a keyboard. The display 118 may optionally be electrically connected to but enclosed in a different housing than the monitoring system 102.

Examples of variables measured by the processor 106 and stored in the memory 108 by the processor include, but are not limited to, overall out-of-order packets, overall packets lost, overall latency, overall jitter, overall number of packets, interval time, number of peak values, and tables of stored values of peak out-of-order packets and timestamps, peak packets lost and timestamps, peak latencies and timestamps, and peak jitters and timestamps. As used herein, "overall" refers to a parameter, measurement, or calculation that applies to the entire duration of a session, rather than to the duration of a single monitoring interval.

When a QOS monitor embodiment 100 successfully initiates a session with another network-enabled device 101, the processor 106 in the QOS monitor 100 initiating the session may reset to zero all performance counters and start to collect performance information about the quality of the session.

The processor 106 may monitor a sequence number of each VoIP packet that arrives from the second network-enabled device 101 and store in a memory variable the number of packets that arrive out-of-order compared to the originally transmitted sequential order. The number of packets out of order may be added to an overall out-of-order packets counter, and may optionally be added to an interval out-of-order packets counter to record the number of out of order packets received during one monitoring interval. The processor may further monitor the sequence number of each VoIP packet it receives and store in a memory variable the number of packets that did not arrive. The number in the memory variable may be added to an overall packets lost counter, and may optionally be added to an interval packets lost counter to record the number of lost packets during one monitoring interval.

The processor 106 may calculate an average for a value of latency of each VoIP packet that arrives from the second telephone 101 by calculating a time difference between the packet that arrived and the previous packet's arrival time. The calculation may not be performed when there is a missing packet. The value of latency may be added to an overall latency counter, and the overall packets counter may be incremented by one. The latency may also be added to an interval latency counter, and the interval packets counter incremented by one.

The processor 106 may measure the jitter of each VoIP packet that arrives from the second telephone 101 by comparing the most recently received packet's latency with the average latency to determine the jitter. The processor 106 may calculate an average value of jitter for the duration of the session and/or the duration of each monitoring interval. When applied to all the packets in a session, the measurement gives overall jitter. When applied to one monitoring interval, the measurement gives interval jitter.

During a selected interval time, the processor may compare the interval counters with the peak counters, and may save the number of peak values measured during a session. When the interval out-of-order counter is larger than the lowest peak out-of-order counter in the peak variable table, then the lowest peak out-of-order counter and timestamp may be replaced by the interval out-of-order counter and current time and date. When the interval packets lost counter is larger than the lowest peak packets lost counter in the peak variable table, then the lowest peak packets lost counter and timestamp may be replaced by the interval Packets lost counter and current time and date.

When the interval latency is greater than the lowest peak latency in the peak variable table, then the lowest peak latency and timestamp may be replaced by the interval latency and current time and date. When the interval jitter is higher than the lowest peak jitter in the peak variable table, then the lowest peak jitter and timestamp may be replaced by the interval jitter and current time and date.

After latency and jitter calculations are completed, all of the interval counters may reset to zero, and monitoring may continue for a new interval. After a session is terminated, a QOS monitor may send overall statistics, peak statistics, an identification of a codec used for the call, the interval time, and possibly other values, to the monitoring system 102. In some QOS monitor embodiments, communications of these values may be conducted in accord with XML over HTTP. The monitoring system 102 may include a webserver that could accept the XML call detail record information from the QOS monitor 100 that initiated the session and store the information in a database.

The monitoring system 102 may monitor network performance at recurring intervals and may save network performance statistics for each session. A user of a QOS monitor embodiment 100 may retrieve information about a session from the monitoring system, possibly learning a reason for poor quality such as, but not limited to, jitter, latency, or packet loss, and review network performance information correlated in time with the measured poor quality of service.

Figure 3A:
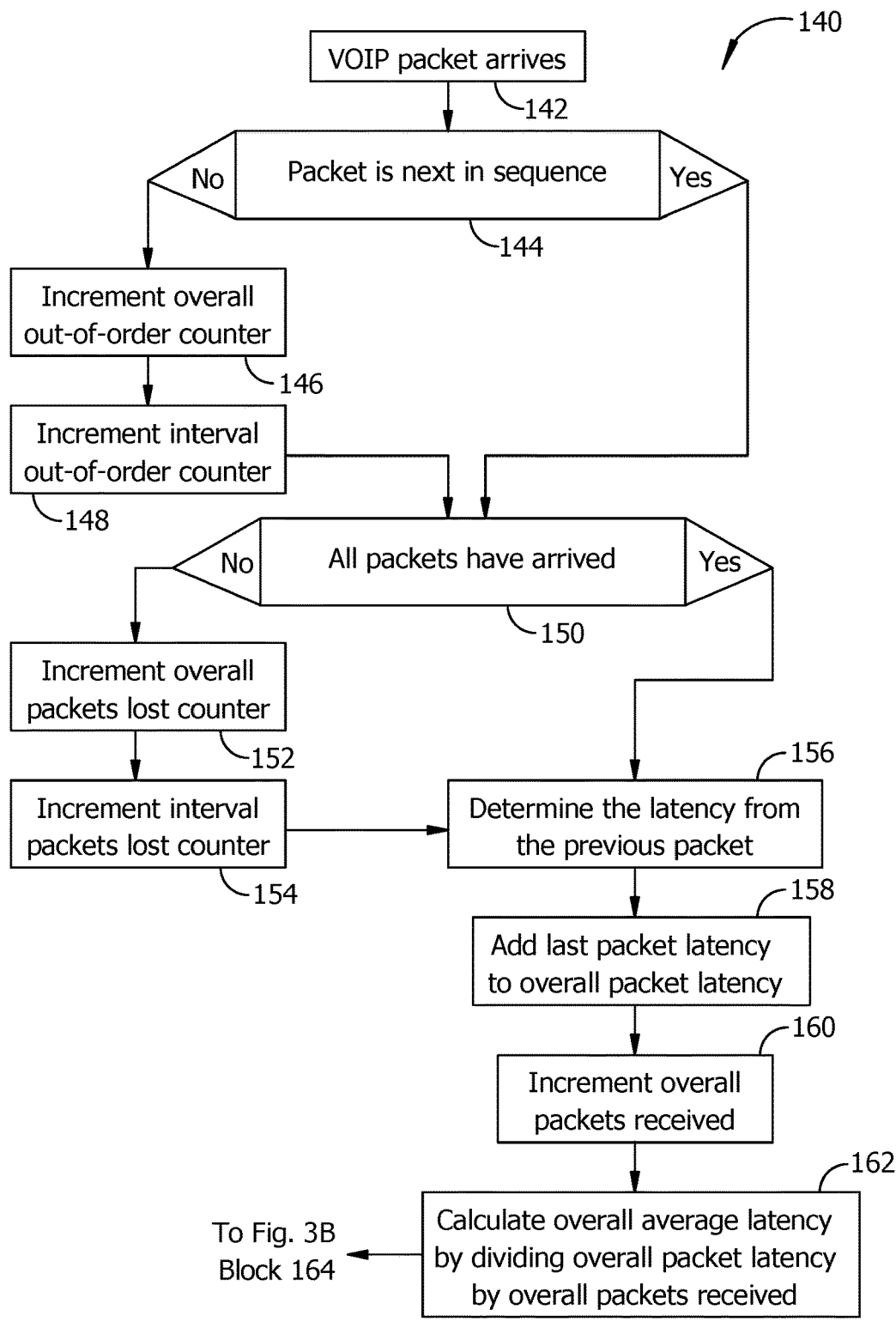
FIG. 3A includes example functions performed by an embodiment from reception of a VoIP packet by an embodiment to latency calculations by an embodiment.
Figure 3B:
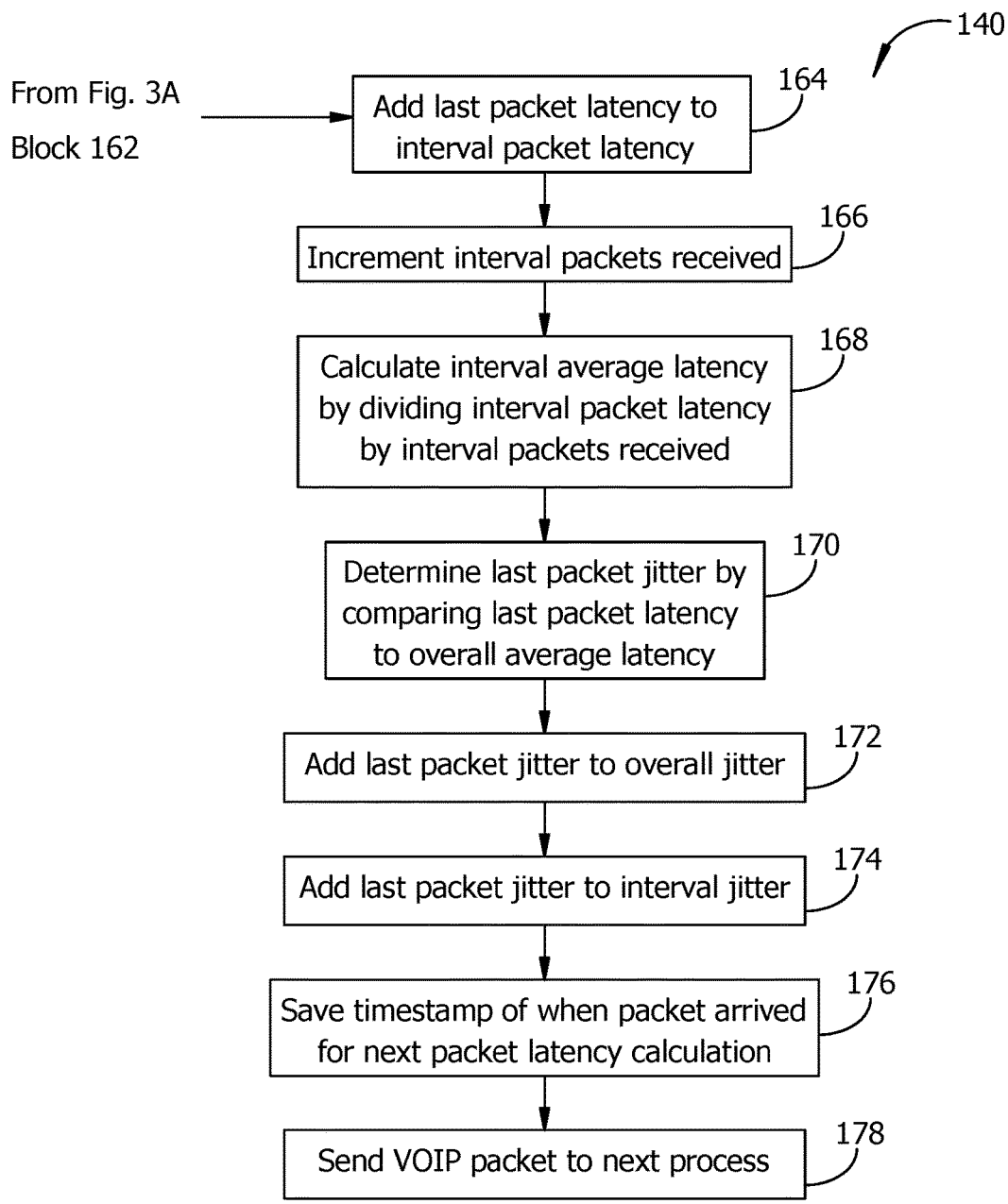
FIG. 3B continues the sequence of functions from the example of FIG. 3A, showing more latency calculations and further including jitter calculations.

A QOS monitor embodiment may measure values related to a received packet as suggested in the example of FIGS. 3A and 3B. Examples of operations 140 performed by the processor 106 in an example QOS monitor 100 begin in FIG. 3A at block 142 with the arrival of a VoIP data packet at the network interface 120. The processor 106 receives the data packet from the network interface 120 and at block 144 examines the data packet' header to determine if the packet has been received in correct sequential order, that is, the same order as the transmitted order. When the packet is determined have been received in the correct sequential order compared to previously received packets, the processor proceeds to block 150. When the processor determines that the data packet has not been received in the correct order, the processor increments an overall out-of-order counter for the call at block 146 and at block 148 increments an interval out-of-order counter that applies to the duration of one monitoring interval, before proceeding to block 150.

At block 150, the processor determines if all data packets related to the call have been received up to the time of the test in block 150. When the processor determines that all data packets have been received, the processor proceeds to block 156. When the processor determines that all data packets have not been received by the QOS monitor 100, the processor increments an overall packets lost counter at block 152 for the total number of packets lost during the call, and increments an interval packets lost counter in block 154 for the number of packets lost during the current interval, before proceeding to block 156.

Next, at block 156 the processor determines a value of latency for the packet compared to the time of arrival of the previously received packet. At block 158, the value of latency for the packet is added to a value of overall packet latency applying to the elapsed time of the call. At block 160, the processor increments the overall number of packets received since the call began. At block 162, the processor calculates an overall average latency value by dividing the overall packet latency value by the overall number of data packets received since the call began.

The example of operations 140 performed by the processor 106 in FIG. 3A continues in FIG. 3B at block 164, where the processor adds the latency for the last (i.e., most recently received) packet to the interval packet latency value. At block 166, the processor increments the number of packets received in the current monitoring interval. At block 168, the processor calculates a value for an interval average latency by dividing the accumulated value of interval packet latency by the number of packets received during the monitoring interval.

Continuing at block 170, the processor next determines a value of packet jitter for the most recently received packet by comparing the latency for the last packet to the overall average value of latency. At block 172, the processor adds the last packet jitter value to the value for overall jitter. At block 174, the processor adds the last packet jitter value to the value for interval jitter. At block 176, the time of arrival of the VoIP packet, referred to as a timestamp for the packet, is saved in a table of jitter and latency values for each packet. The example process 140 ends at block 178, where the received VoIP data packet is forwarded to a next process in the QOS monitor 100, for example sending the packet to the DAC 112 for conversion to an electrical signal for driving the audio speaker 114.

Figure 4A:
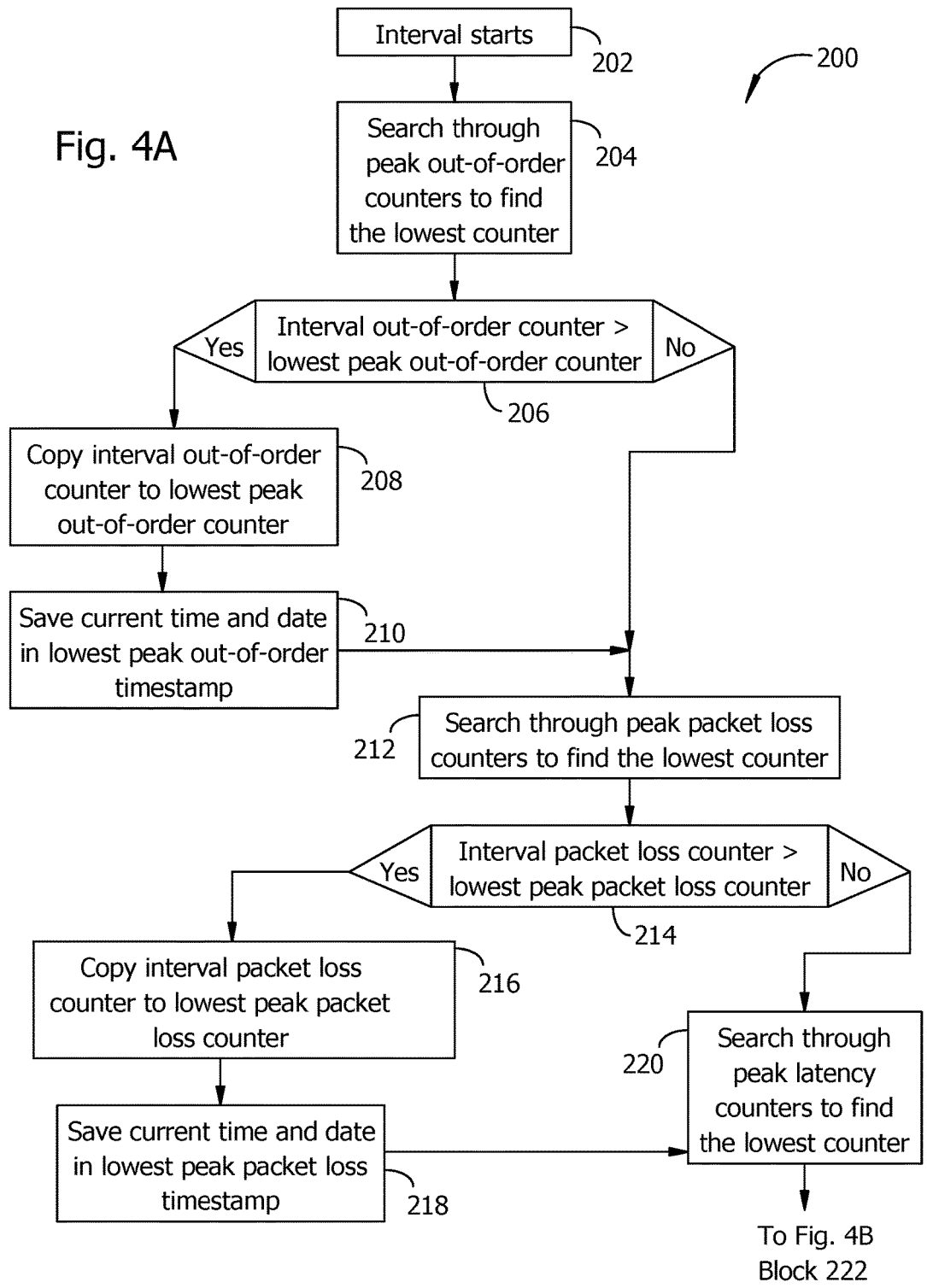
FIG. 4A includes example functions performed by an embodiment from the start of a monitoring interval to a search of peak latency counters.
Figure 4B:
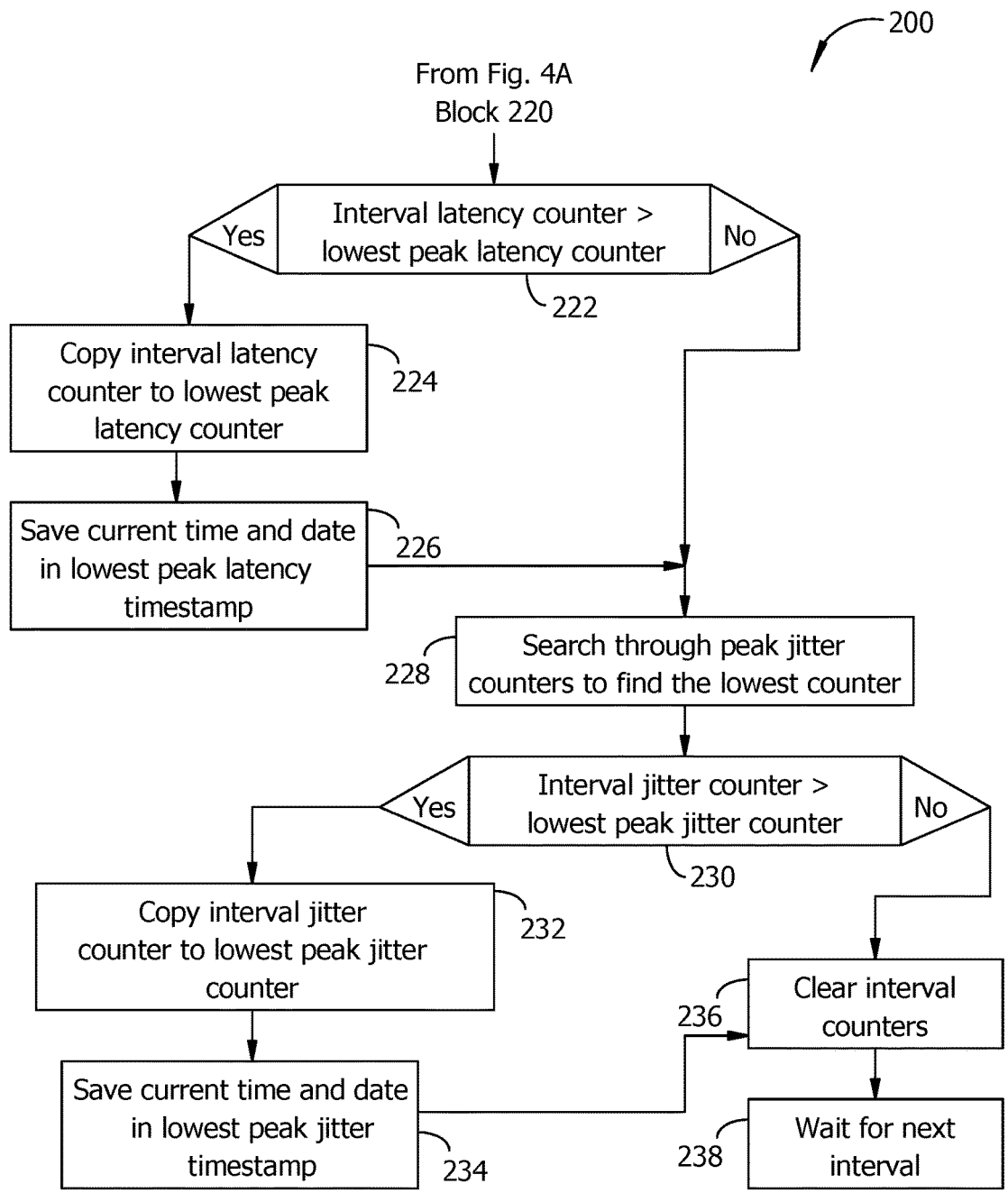
FIG. 4B continues the sequence of functions from the example of FIG. 4A, showing more latency and jitter calculations by an embodiment.

FIGS. 4A and 4B show examples of operations 200 performed by an example QOS monitor embodiment 100 for measurements made during one monitoring interval. The processor starts timing an interval having a specified duration at block 202. At block 204, the processor searches through a table of peak out-of-order counter values to find the lowest counter value, each counter value corresponding to a separate monitoring interval. At block 206, the processor determines if an interval out-of-order counter for the current interval is greater than the lowest peak out-of-order counter value found in block 204. If not, the processor proceeds to block 212.

When the interval out-of-order counter is greater than the lowest peak out-of-order counter from block 204, the processor copies the interval out-of-order counter to the lowest peak out-of-order counter in block 208. In block 210 saves the current time and date in a timestamp with the lowest peak out-of-order counter in a table, then proceeds to block 212.

In block 212, the processor searches through a table of peak packet loss counters to find the value for the lowest counter. In block 214, the process compares the interval packet loss counter for the current interval to the lowest peak packet loss counter. When the interval packet loss counter is not less than the lowest peak packet loss counter, the processor proceeds to block 220, otherwise the processor proceeds to block 216 to copy the interval packet loss counter to the lowest peak packet loss counter. Next, the processor saves the current time and date in the lowest peak packet loss timestamp before proceeding to block 220. At block 220, the processor searches through a table of peak latency counters to find the lowest counter.

The example operations 200 of FIG. 4A continue in FIG. 4B at block 222, where the processor compares the interval latency counter to the lowest peak latency counter. When the interval latency counter is not greater than the lowest peak latency counter, the process continues at block 228, otherwise the processor copies the interval latency counter to the lowest peak latency counter at block 224, saves the current time and date in the lowest peak latency timestamp, and then proceeds to block 228.

At block 228, the processor searches through a table of peak jitter counters to find the lowest counter. At block 230, the processor compares the interval jitter counter to the lowest peak jitter counter. When the interval jitter counter is not greater than the lowest peak jitter counter, the process continues to block 236, otherwise the processor copies the interval jitter counter to the lowest peak jitter counter in block 232. The processor continues by saving the current time and date in the lowest peak jitter timestamp and proceeds to block 236. At block 236, the processor resets all interval counters to zero and at block 238 the processor waits for the next interval to start.

Figure 5:
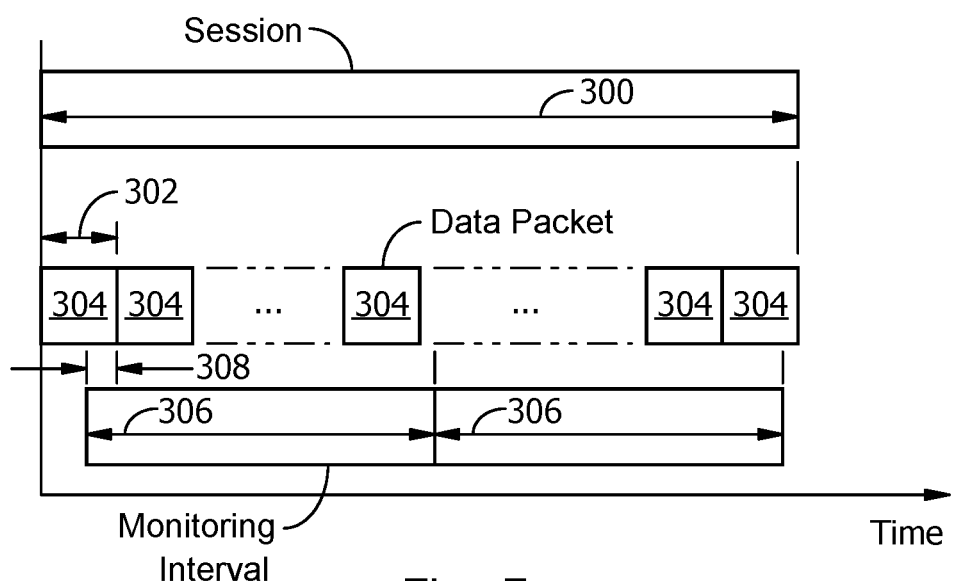
FIG. 5 is an example timing diagram illustrating time durations of a telephone call, a data packet, and a monitoring interval relative to one another, and further illustrating an asynchronous condition between a monitoring interval and a data packet.

FIG. 5 illustrates some features of an example session including time duration 300 of a session, time duration 302 of a data packet 304, and a monitoring interval 306 occurring asynchronously 308 to a data packet 302.

U.S. Provisional Patent Application Ser. No. 60/795,146 and U.S. Provisional Patent Application Ser. No. 62/222,056 are incorporated herein by reference in their entirety.

Unless expressly stated otherwise herein, ordinary terms have their corresponding ordinary meanings within the respective contexts of their presentations, and ordinary terms of art have their corresponding regular meanings.

What is claimed is:
1. A quality of service monitor, comprising:
a processor;
a memory connected for data communication with said processor;
a network interface connected for data communication with said processor;
a duration of a monitoring interval stored by said processor in said memory, wherein said duration of a monitoring interval is less than a duration of a network communications session;

a quality of service value for said monitoring interval measured by said processor and stored in said memory;

a poorest quality of service value stored in said memory by said processor, said poorest quality of service determined by said processor from a plurality of said monitoring interval; and a quality of service stored for a complete session stored in said memory by said processor, said quality of service for a complete session corresponding to said value for a poorest quality of service measured for one of said monitoring interval, wherein said processor starts a said monitoring interval for measuring a quality of service value asynchronously with said network communications session, and said processor finds a lowest peak out-of-order counter.

2. The quality of service monitor of claim 1, wherein said processor finds a lowest peak packet loss counter when an interval out-of-order counter is not greater than said lowest peak out-of-order counter.

3. The quality of service monitor of claim 2, wherein said processor copies said interval out-of-order counter to said lowest peak out-of-order counter when said interval out-of-order counter is greater than said lowest peak out-of-order counter.

4. The quality of service monitor of claim 3, wherein said processor saves in said memory a current time and date in a lowest peak out-of-order timestamp.

5. The quality of service monitor of claim 2, wherein said processor searches through a plurality of a peak latency counter to find a lowest counter and compares said interval out-of-order counter to said lowest peak out-of-order counter.

6. The quality of service monitor of claim 2, wherein said processor copies said interval packet lost counter to said lowest peak packet loss counter when said interval packet loss counter is greater than said lowest peak packet loss counter.

7. The quality of service monitor of claim 1, wherein said processor searches through a plurality of a peak jitter counter to find a lowest peak jitter counter when an interval latency counter is greater than a lowest peak latency counter.

8. The quality of service monitor of claim 7, wherein said processor copies an interval jitter counter to said lowest peak jitter counter when said interval jitter counter is greater than said lowest peak jitter counter.

9. The quality of service monitor of claim 7, wherein said processor clears all interval counters and waits for a next interval when said interval jitter counter is not greater than said lowest peak jitter counter.

\* \* \* \* \*